(12) United States Patent
Yamashita et al.

(10) Patent No.: US 7,472,679 B2
(45) Date of Patent: Jan. 6, 2009

(54) VALVE CONTROL DEVICE AND VALVE CONTROL METHOD FOR INTERNAL COMBUSTION ENGINE

(75) Inventors: Hiroshi Yamashita, Kariya (JP); Hideki Suzuki, Chita-gun (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/923,370

(22) Filed: Oct. 24, 2007

(65) Prior Publication Data

US 2008/0098977 A1   May 1, 2008

(30) Foreign Application Priority Data

Oct. 30, 2006   (JP)   ............... 2006-293398

(51) Int. Cl.
*F02B 3/00*   (2006.01)
*F02B 15/00*   (2006.01)

(52) U.S. Cl. ............... 123/302; 123/308; 123/432

(58) Field of Classification Search ............... 123/302, 123/306, 376, 403, 431, 432, 308, 299, 184.42, 123/184.43, 184.45
See application file for complete search history.

(56) References Cited

U.S. PATENT DOCUMENTS

| 4,548,175 | A | * | 10/1985 | Kawai et al. | ............... 123/308 |
| 4,805,569 | A | * | 2/1989 | Suzumura et al. | ........... 123/308 |
| 5,050,557 | A | * | 9/1991 | Ishida et al. | ............... 123/432 |
| 5,174,260 | A | * | 12/1992 | Nonogawa et al. | .......... 123/432 |
| 6,378,506 | B1 | * | 4/2002 | Suhre et al. | ................. 123/564 |

FOREIGN PATENT DOCUMENTS

JP   8-121180   5/1996

* cited by examiner

*Primary Examiner*—Mahmoud Gimie
(74) *Attorney, Agent, or Firm*—Nixon & Vanderhye PC

(57) ABSTRACT

An intake throttle valve is located in an intake passage upstream of first and second intake ports, such that intake air flows into mainly the first intake port to generate a swirl flow when an opening degree of the intake throttle valve is not larger than a predetermined value, and flows into both the first and second intake ports when the opening degree thereof is larger than the predetermined value. Furthermore, first and second fuel injection valves for respectively injecting fuel to the first and second intake ports are controlled to inject fuel from the first fuel injection valve when the opening degree of the intake throttle valve is not larger than about the predetermined value, and to inject fuel from both the first fuel injection valve and the second fuel injection valve when the opening degree of the intake throttle valve is larger than about the predetermined value.

12 Claims, 4 Drawing Sheets

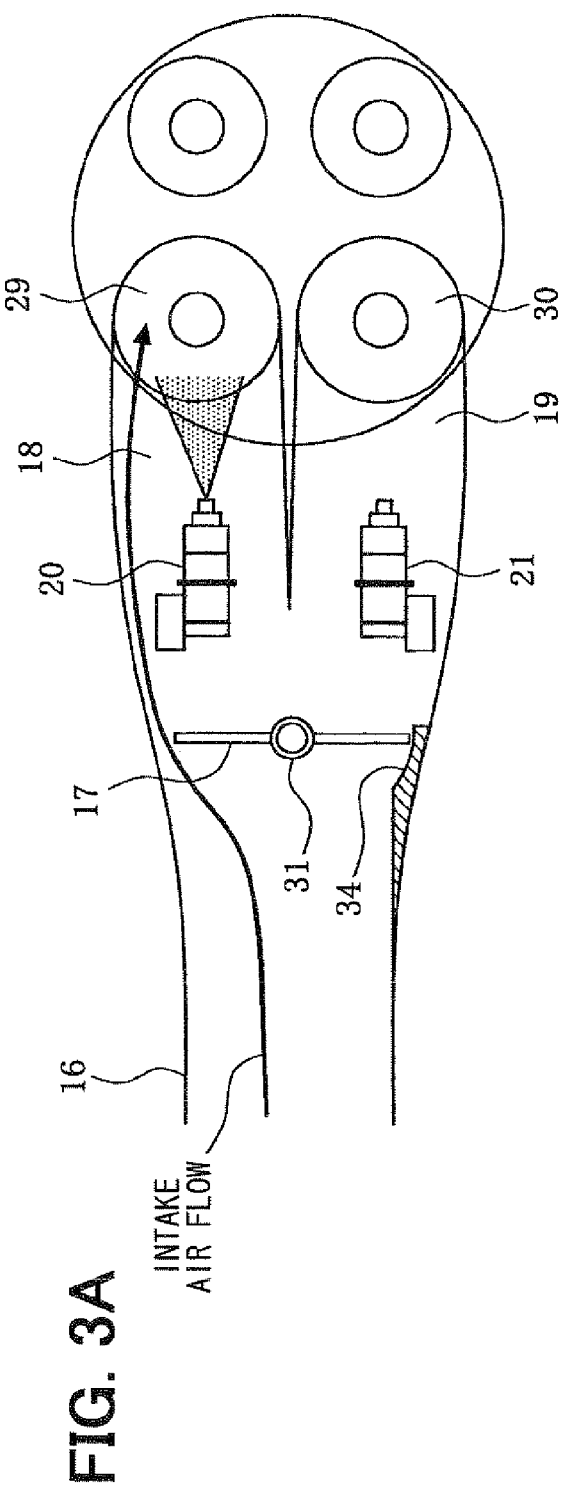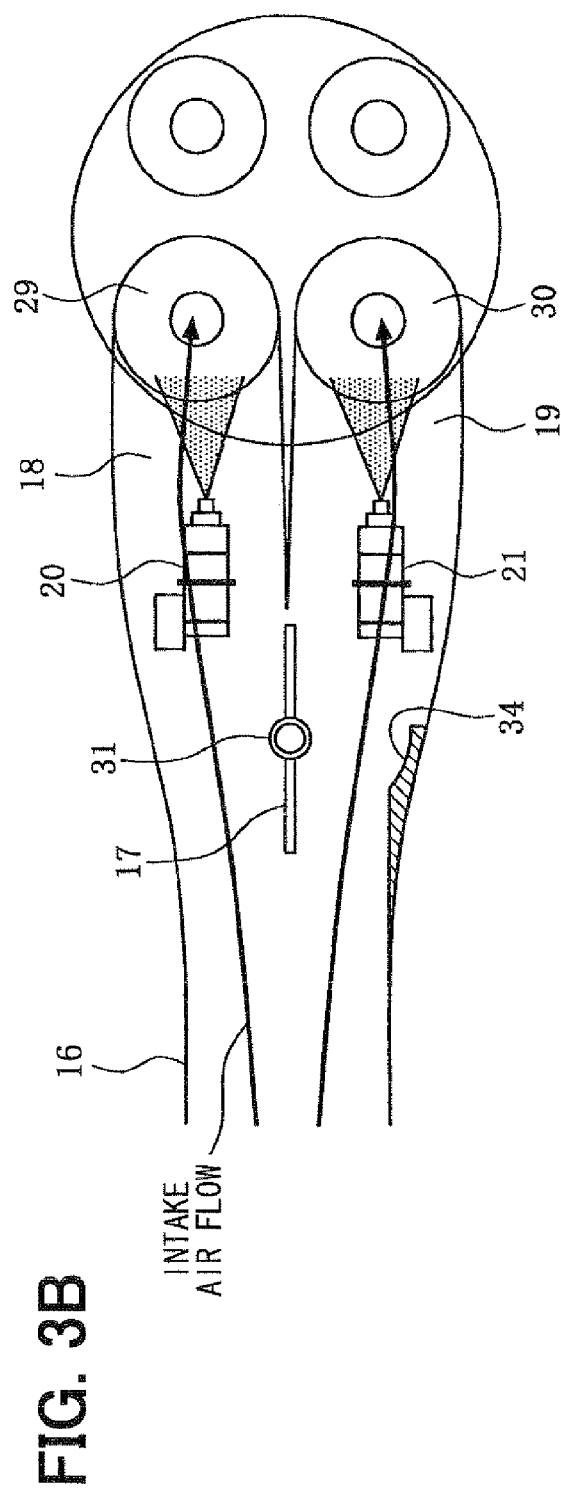

VALVE CONTROL DEVICE AND VALVE CONTROL METHOD FOR INTERNAL COMBUSTION ENGINE

CROSS REFERENCE TO RELATED APPLICATION

This application is based on Japanese Patent Application No. 2006-293398 filed on Oct. 30, 2006, the contents of which are incorporated herein by reference in its entirety.

FIELD OF THE INVENTION

The present invention relates to a valve control device for an internal combustion engine, which includes an intake throttle valve and two intake ports in one cylinder, and a valve control method for the internal combustion engine.

BACKGROUND OF THE INVENTION

For example, in JP-A-8-121180, a throttle valve for adjusting an amount of intake air is disposed in an intake pipe on the upstream side from an intake manifold of each cylinder of an internal combustion engine. Further, a swirl control valve is disposed in a passage on one intake port side of two intake ports provided in each cylinder, while a fuel injection valve is disposed in a passage on the other intake port side. During a low or medium load operation in which the amount of intake air is small, the swirl control valve is closed to allow the intake air to flow only through the intake port on the fuel injection valve side, so that a swirl flow is generated to promote homogenization of an air-fuel mixture. During a high load operation in which the amount of intake air is large, the swirl control valve is opened to allow the intake air to flow into both intake ports.

In such a system, when switching operations between opening and closing of the swirl control valves of the respective cylinders are performed at the same time in a transient operation for switching between opening and closing of the swirl control valve, the amount of intake air may greatly change to cause torque shock. For this reason, timings of opening and closing of the swirl control valves of the respective cylinders are controlled to be shifted from each other, thereby preventing the rapid change of the intake air amount due to the opening and closing of the swirl control valve.

However, when the swirl control valve is opened to allow the intake air to flow into both intake ports during the high load operation, fuel may be injected only into one of the two intake ports, that is, an intake port on the side where the fuel injection valve is disposed. In this case, the air-fuel mixture cannot be sufficiently homogeneous.

In order to prevent the drastic change (torque shock) in amount of the intake air due to the opening and closing of the swirl control valve, it is necessary to control the swirl control valves of the respective cylinders such that the opening and closing timings of these valves are shifted from each other. This leads to complicated control of the swirl control valves, resulting in increased computation load of a control computer.

Furthermore, because a throttle valve for adjusting the amount of intake air and a swirl control valve for generating the swirl flow are required to be provided independently, the valve structure becomes complicated, resulting in an increase in cost.

SUMMARY OF THE INVENTION

It is an object of the present invention to provide a valve control device or/and a valve control method for an internal combustion engine, which can promote homogenization of an air-fuel mixture in all operation areas, and also can simplify the control and structure thereof.

According to an aspect of the present invention, a valve control device for an internal combustion engine includes an intake manifold for defining an intake air passage having first and second intake ports which are located at a downstream side of the intake air passage for each cylinder of the engine, an intake throttle valve located in the intake air passage at an upstream side of the first and second intake ports, a first fuel injection valve located to inject fuel to the first intake port, a second fuel injection valve located to inject the fuel to the second intake port, and a control unit which controls the first fuel injection valve and the second fuel injection valve. The intake throttle valve is located such that intake air flows into mainly the first intake port to generate a swirl flow when an opening degree of the intake throttle valve is not larger than a predetermined value, and flows into both the first and second intake pods when the opening degree of the intake throttle valve is larger than the predetermined value. Furthermore, the control unit controls the first fuel injection valve and the second fuel injection valve to allow an injection of the fuel from the first fuel injection valve when the opening degree of the intake throttle valve is not larger than about the predetermined value, and controls the first fuel injection valve and the second fuel injection valve to allow injections of the fuel from both the first fuel injection valve and the second fuel injection valve when the opening degree of the intake throttle valve is larger than about the predetermined value.

With this arrangement, when the opening degree of the intake throttle valve is substantially equal to or less than the predetermined value, the intake air mainly flows through the first intake port to generate a swirl flow in the cylinder, while the fuel is injected from the first fuel injection valve to the first intake port Thus, it can promote the homogenization of an air-fuel mixture. In contrast, when the opening degree of the intake throttle valve is substantially larger than the predetermined value, the intake air flows through both of the first and second intake ports, while the fuel is injected from both the first and second fuel injection valves to the respective first and second intake ports. Thus, it can also promote the homogenization of an air-fuel mixture. As a result, the homogenization of the air-fuel mixture can be promoted in all operation areas from a low load operation area where an opening degree of the intake throttle valve is small to a high load operation area where an opening degree of the intake throttle valve is large.

Since the intake air amount can be adjusted according to the opening degree of the intake throttle valve to control the occurrence of the swirl flow, the drastic change (torque shock) of the intake air amount hardly occurs due to the opening and closing of the intake throttle valve. In order to prevent the drastic change of the intake air amount, a complicated control is also not required, thereby simplifying the control of the intake throttle valve.

Since the intake throttle valve can have a function of adjusting the amount of intake air, and also a function of generating a swirl flow, a valve for adjusting the intake air amount and a valve for generating the swirl flow do not need to be provided independently, thereby simplifying the structure and satisfying the demand for cost reduction.

According to another aspect of the present invention, a valve control device for an internal combustion engine includes an intake manifold for defining an intake air passage having first and second intake ports which are located at a downstream side of the intake air passage for each cylinder of the engine, an intake throttle valve located in the intake air passage at an upstream side of the first and second intake ports, a first fuel injection valve located to inject fuel to the first intake port, and a second fuel injection valve located to inject the fuel to the second intake port. The intake throttle valve is located such that intake air flows into mainly the first intake port to generate a swirl flow when an opening degree of the intake throttle valve is not larger than a predetermined value, and flows into both the first and second intake ports when the opening degree of the intake throttle valve is larger than the predetermined value, and a control unit controls the first fuel injection valve and the second fuel injection valve in accordance with the opening degree of the intake throttle valve. Furthermore, a bore member is located in the intake air passage at a position adjacent to the intake throttle valve to prohibit a flow of the intake air to the second intake port when the opening degree of the intake throttle valve is not larger than the predetermined value. Accordingly, it is possible to control the swirl flow from the first intake port while keeping a substantially closing state of the second intake port when the opening degree of the intake throttle valve is not larger than the predetermined value. As a result, it can promote homogenization of the air-fuel mixture in all operation areas, and also can simplify the structure in the intake manifold.

For example, the bore member may have an inner surface provided to match with the shape of a contour of the intake throttle valve on a side of the second intake port when the opening degree of the intake throttle valve is not larger than the predetermined value.

According to another aspect of the present invention, a valve control method for an internal combustion engine includes a step of detecting an opening degree of an intake throttle valve that located in the intake air passage at an upstream side of the first and second intake ports, a step of determining whether the opening degree of the intake throttle valve is larger than a predetermined value, a step of controlling the intake throttle valve such that intake air flows into mainly the first intake port to generate a swirl flow when the opening degree of the intake throttle valve is not larger than a predetermined value, and flows into both the first and second intake ports when the opening degree of the intake throttle valve is larger than the predetermined value, and a step of controlling a first fuel injection valve and a second fuel injection valve to allow an injection of the fuel from the first fuel injection valve into the first intake port when the opening degree of the intake throttle valve is not larger than about the predetermined value, and a step of controlling the first fuel injection valve and the second fuel injection valve to allow injections of the fuel from both the first fuel injection valve and the second fuel injection valve when the opening degree of the intake throttle valve is larger than about the predetermined value. Accordingly, the homogenization of the air-fuel mixture can be promoted in all operation areas from a low load operation area where an opening degree of the intake throttle valve is small to a high load operation area where an opening degree of the intake throttle valve is large.

For example, the valve control method may further includes a step of prohibiting a flow of the intake air to the second intake port when the opening degree of the intake throttle valve is not larger than the predetermined value. Furthermore, the step of the controlling of the first and second fuel injection valves may include a step of setting an amount of the fuel injected from the first fuel injection valve and an amount of the fuel injected from the second fuel injection valve in accordance with a ratio of an amount of intake air flowing into the first intake port to that into the second intake port when the opening degree of the intake throttle valve is larger than about the predetermined value.

BRIEF DESCRIPTION OF THE DRAWINGS

Additional objects and advantages of the present invention will be more readily apparent from the following detailed description of preferred embodiments when taken together with the accompanying drawings. In which:

FIG. 3A is a cross-sectional view showing a state of an intake throttle valve and a peripheral portion thereof when the valve is completely closed in the engine control system, and FIG. 3B is a cross-sectional view showing a state of the intake throttle valve and the peripheral portion thereof when the valve is completely opened in the engine control system;

DETAILED DESCRIPTION OF THE PREFERRED EMBODIMENTS

Figure 1:
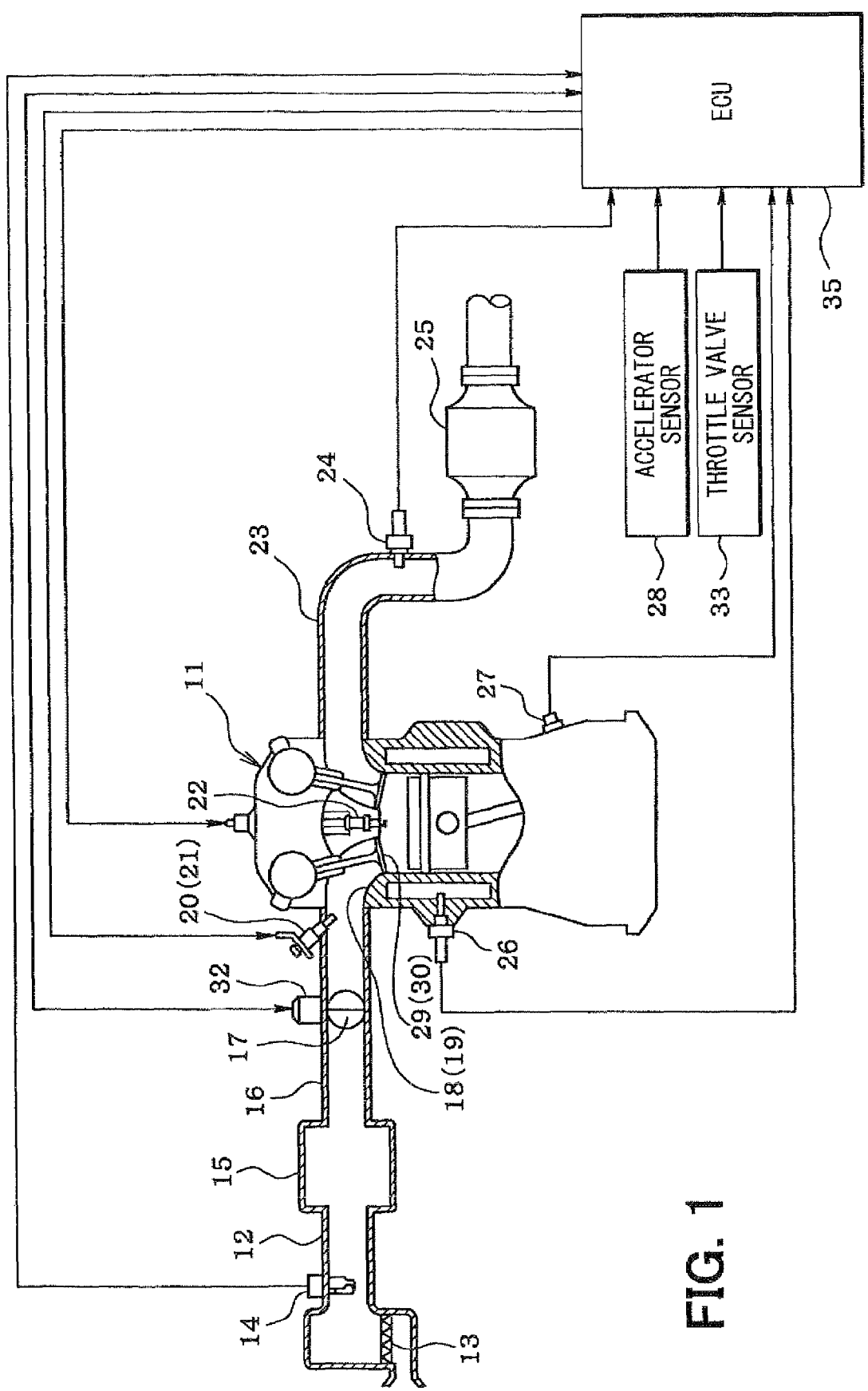
FIG. 1 is a schematic diagram of an entire engine control system in one example of the invention.

The outline of the entire structure of an engine control system will be described below based on FIG. 1.

An air cleaner 13 is provided on an uppermost stream side of an intake pipe 12 of an engine 11, which is an internal combustion engine, for example. An air flow meter 14 for detecting an amount of intake air is provided on a downstream side of the air cleaner 13. A surge tank 15 is provided on a downstream side of the air flow meter 14. An intake manifold 16 (intake passage) is provided in the surge tank 15, for introducing the air into each cylinder of the engine 11. An intake throttle valve 17 for adjusting an amount of intake air is provided in the intake manifold 16 of each cylinder. Fuel injection valves 20 and 21 for injecting fuel therefrom are attached near two intake ports 18 and 19 of each cylinder (see FIGS. 2, 3A, and 3B). An ignition plug 22 is attached for each cylinder to a cylinder head of the engine 11. Spark discharge of each ignition plug 22 ignites the air-fuel mixture in the cylinder.

In contrast, an exhaust gas sensor 24 (an air/fuel ratio sensor, an oxygen sensor, or the like) for detecting an air/fuel ration, a rich/lean, or the like of an exhaust gas is provided in an exhaust pipe 23 of the engine 11. A catalyst 25, such as a three way catalyst, for purifying the exhaust gas is provided on a downstream side of the exhaust gas sensor 24.

In a cylinder block of the engine 11, are attached a coolant temperature sensor 26 for detecting the temperature of a coolant, and a crank angle sensor 27 for outputting a pulse signal every time a crank shaft of the engine 11 rotates by a predetermined crank angle. The crank angle and engine speed are detected based on an output signal of the crank angle sensor 27. An amount of an accelerator operation (an amount of pressing an accelerator pedal) is detected by an accelerator sensor 28.

Figure 2:
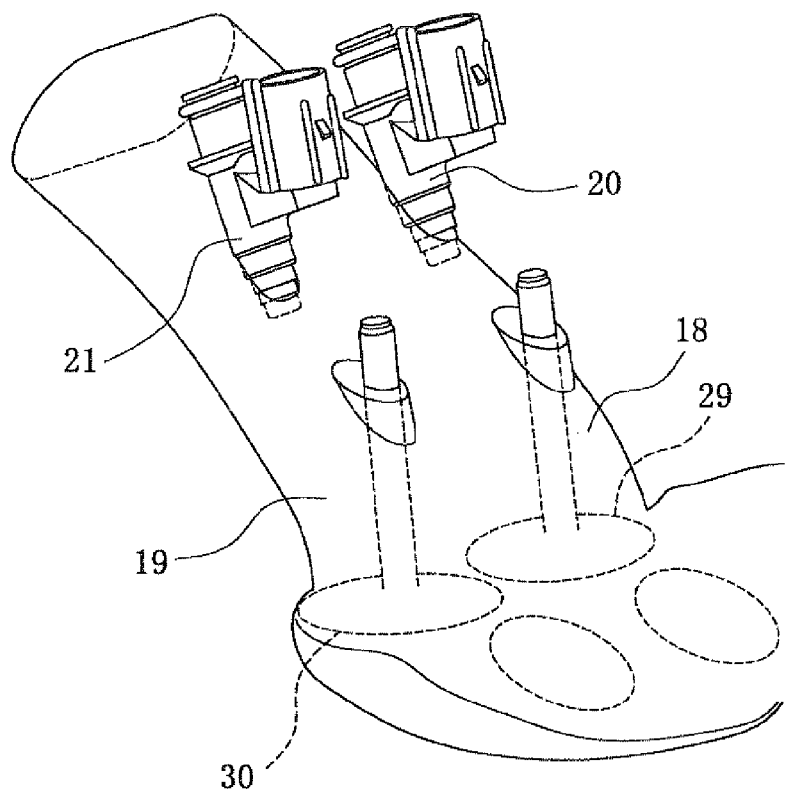
FIG. 2 is a perspective view of a fuel injection valve and a peripheral portion thereof in the embodiment.

As shown in FIGS. 2, 3A, and 3B, two independent intake ports 18 and 19 are provided in each cylinder of the engine 11. The first intake port 18 and the second intake port 19 are opened and closed by respective intake valves 29 and 30. A first fuel injection valve 20 for injecting fuel to the first intake port 18 is disposed on the first intake port 18. A second fuel injection valve 21 for injecting fuel to the second intake port 19 is disposed on the second intake port 19.

As shown in FIGS. 3A and 3B, the first intake port 18 and the second intake port 19 are respectively connected to one intake manifold 16 of each cylinder. An intake throttle valve 17 is disposed near a branch portion between the first intake port 18 and the second intake port 19. The intake throttle valve 17 of each cylinder is provided so as to be rotatably opened and closed with a shaft 31 coupled to the center thereof as a rotation shaft from a completely closed position shown in FIG. 3A to a completely opened position shown in FIG. 3B. Specifically, the completely closed position is the position of the valve substantially perpendicular to the flow direction of air sucked in the intake manifold 16. The completely opened position is the position of the valve substantially parallel to the flow direction of intake air into the intake manifold 16. A motor 32 (see FIG. 1) is coupled to the shaft 31 of the intake throttle valve 17, and is controlled according to an engine operation state (an amount of an accelerator operation, or the like), thereby to control an opening degree of the intake throttle valve 17 of each cylinder. The opening degree of the intake throttle valve 17 is detected by an intake throttle opening-degree sensor 33, as shown in FIG. 1.

Figure 4:
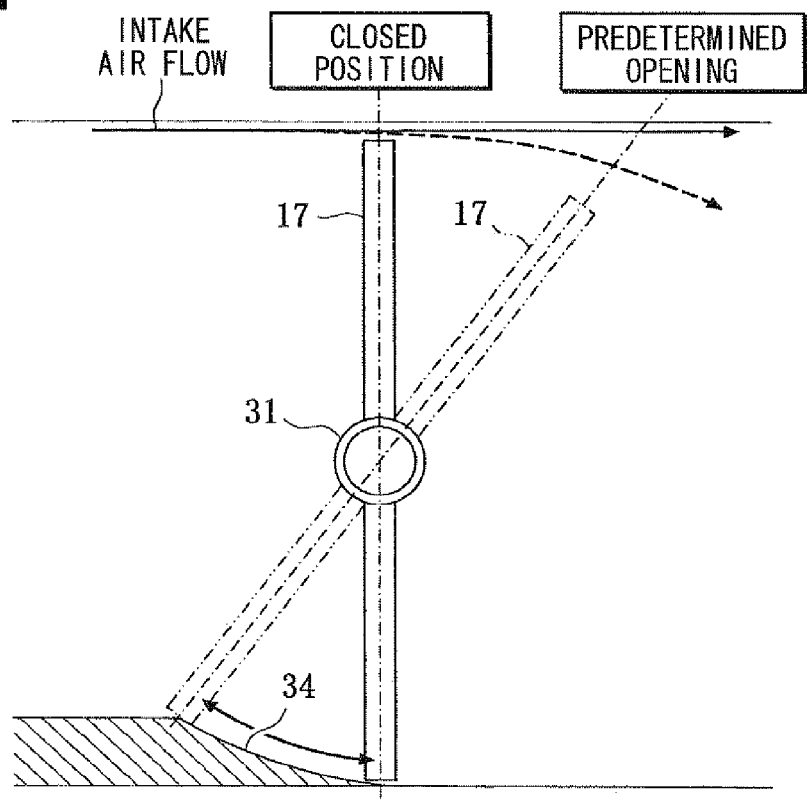
FIG. 4 is an enlarged cross-sectional view showing the intake throttle valve and the peripheral portion thereof.

As shown in FIGS. 3A, 3B and 4, a bore member 34 is provided for inhibiting the flow of the intake air into the second intake port 19 when the intake throttle valve 17 is substantially closed. The bore member 34 is located on the side of the second intake port 19 with respect to the intake throttle valve 17. The bore member 34 has a smoothly curved inner surface formed so as to match with the shape of a contour of the second intake port 19 of the intake throttle valve 17, which is a contour of a side end of the second intake port 19 when the intake throttle valve 17 is located near the completely closed position. That is when the opening degree of the intake throttle valve 17 is in a range from a value corresponding to the completely closed position (0 degree) to a predetermined opening degree (for example, 6 to 7 degrees), a clearance on the second intake port 19 side of the intake throttle valve 17 is covered with the bore member 34. Thus, at this time, a flow path for the intake air is formed only on the first intake port 18 of the intake throttle valve 17. The bore member 34 has its inner surface formed in a spherical shape when the shape of the contour of the second intake port 19 of the intake throttle valve 17 is formed in a circular shape. When the shape of the contour of the second intake port 19 of the intake throttle valve 17 is linear, the shape of an inner surface of the bore member 34 may be formed in an arc shape. In short, the bore member 34 may be constructed to have the shape of an inner surface matching with the shape of the second intake port 19 side of the intake throttle valve 17.

Thus, as shown in FIG. 3A, when the opening degree of the intake suction valve 17 is equal to or less than a predetermined opening degree, the flow path for the intake air is formed only on the side of the first intake port 18 of the intake throttle valve 17. The intake air passing through the intake throttle valve 17 flows only into the first intake port 18 to generate the swirl flow in the cylinder. The larger the opening degree of the intake throttle valve 17, the larger the sectional area of the flow path on the first intake port 18 side of the intake throttle valve 17, so that the amount of intake air passing through the intake throttle valve 17 is increased.

In contrast, as shown in FIG. 3B, when the opening degree of the intake throttle valve 17 is larger than the predetermined opening degree, flow paths for the intake air are formed on both sides of the intake throttle valve 17. The intake air passing through the intake throttle valve 17 flows into both of the first intake port 18 and the second intake port 19. And, the larger the opening degree of the intake throttle valve 17, the larger the sectional areas of the flow paths on both sides of the intake throttle valve 17. This results in an increase in amount of intake air passing through the intake throttle valve 17.

The outputs from various sensors as described above are input into a control circuit (hereinafter referred to as an "ECU") 35. The ECU 35 mainly includes a microcomputer, and various engine control programs stored in a ROM (storage medium) incorporated therein are executed thereby to control the amounts of fuel injected from the fuel injection valves 20 and 21, and an ignition time of the ignition plug 22 according to the engine operation state.

The ECU 35 calculates a target opening degree of the intake throttle valve 17 based on an accelerator operation amount or the like detected by an accelerator sensor 28, and the motor 32 of the intake throttle valve 17 is controlled such that an actual opening degree of the intake throttle valve 17 matches with the target opening degree.

The ECU 35 executes a fuel injection control program shown in FIG. 5 to be described later to control the fuel injection valves 20 and 21. Specifically, when the opening degree of the intake throttle valve 17 is equal to or less than the predetermined opening degree (that is, when the intake air passing through the intake throttle valve 17 flows only into the first intake port 18), the ECU 35 controls these valves 20 and 21 in the following way. That is, the fuel is injected from the first fuel injection valve 20, while the injection of the fuel from the second fuel injection valve 21 is stopped. Thus, the intake air flows only into the first intake port 18 to generate a swirl flow in the cylinder, while the fuel is injected from the first fuel injection valve 20 to the first intake port 18, which promotes the homogenization of an air-fuel mixture.

In contrast, when the opening degree of the intake throttle valve 17 is larger than a predetermined opening degree, that is, when the intake air having passed through the intake throttle valve 17 flows into both the first intake port 18 and the second intake port 19, an amount of fuel injected from the first fuel injection valve 20 and an amount of fuel injected from the second fuel injection valve 21 are set according to a ratio of the amount of intake air flowing into the first intake port 18 to that into the second intake port 19. The respective fuel injection valves 20 and 21 are controlled such that the fuel is injected from both the first fuel injection valve 20 and the second fuel injection valve 21. Thus, the intake air flows into both the first intake port 18 and the second intake port 19, while the fuel is injected from the first fuel injection valve 20 and the second fuel injection valve 21 into the first intake port 18 and the second intake port 19, thereby promoting homogenization of the air-fuel mixture.

The contents of processing of the fuel injection control program of FIG. 5 performed by the ECU 35 will be described below.

Figure 5:
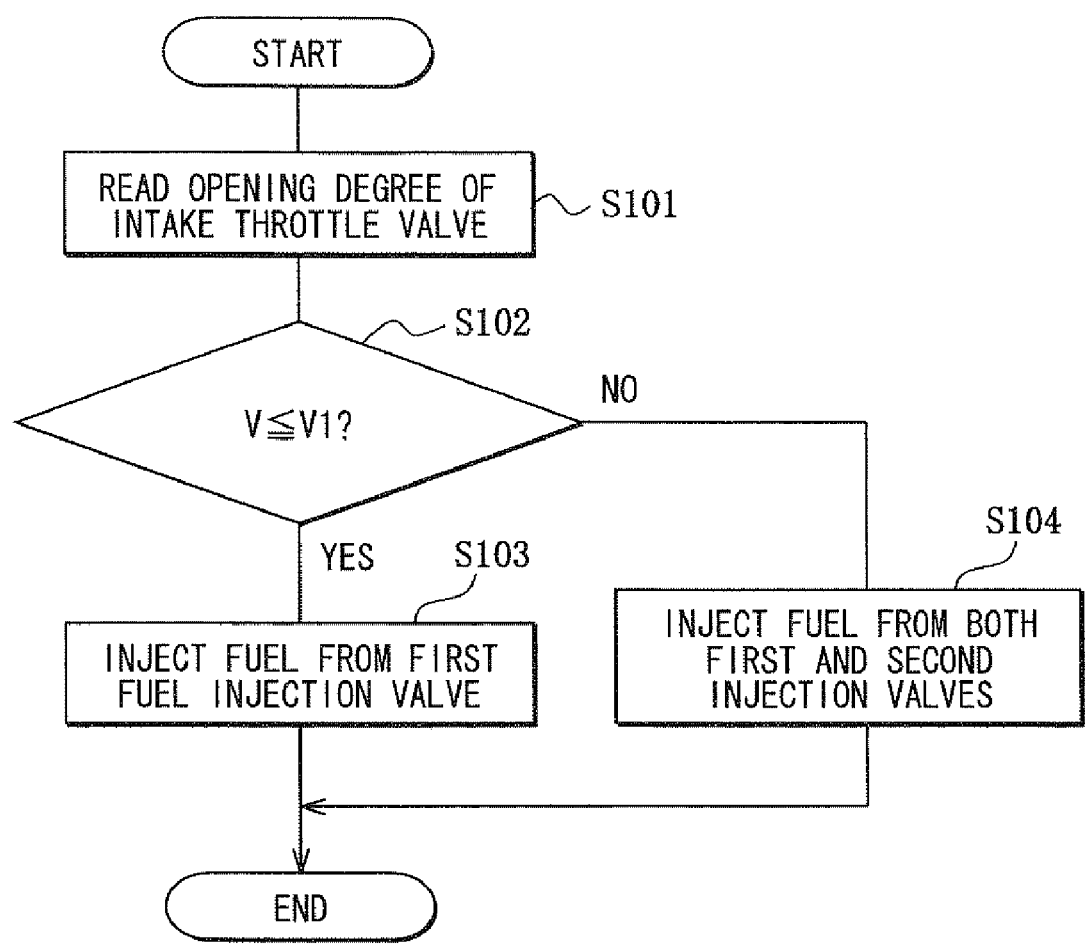
FIG. 5 is a flowchart showing a control process of a fuel injection control program according to the embodiment.

The fuel injection control shown in FIG. 5 is performed in a predetermined cycle while a power supply of the ECU 35 is turned on. The control program of FIG. 5 serves as a fuel injection control unit for controlling a fuel injection. When the present program is started up, an opening degree of the intake throttle valve 17 detected by the intake throttle valve opening-degree sensor 33 is read out at Step S101. Then, the control operation proceeds to Step S102, in which it is determined whether the opening degree (V) of the intake throttle valve 17 is equal to or less than the predetermined opening degree (V1) (for example, 6 to 7 degrees).

When the opening degree (V) of the intake throttle valve 17 is determined to be equal to or less than the predetermined opening degree (V1) in Step S102, the control operation proceeds to Step S103 in which the respective fuel injection valves 20 and 21 are controlled such that the fuel is injected from the first fuel injection valve 20 while stopping injection of the fuel from the second fuel injection valve 21.

Thus, when the opening degree of the intake throttle valve 17 is equal to or less than the predetermined opening degree, the intake air having passed through the intake throttle valve 17 flows only into the first intake port 18. In this case, the intake air flows only through the first intake port 18 to generate a swirl flow in the cylinder, while the fuel is injected from the first valve 20 to the first intake port 18. This promotes the homogenization of the air-fuel mixture.

In contrast, when the opening degree of the intake throttle valve 17 is determined to be larger than the predetermined opening degree in Step S102, the operation proceeds to Step S04. In Step S04, for example, the amount of fuel injected from the first injection valve 20 and the amount of fuel injected from the second fuel injection valve 21 are set according to the opening degree of the intake throttle valve 17. That is, the amounts of fuel injected from the first and second fuel injection valves 20 and 21 are set according to the ratio of the amount of the intake air flowing into the first intake port 18 to that into the second intake port 19. And, the first and second fuel injection valves 20 and 21 are controlled such that the fuel is injected from both of the fuel injection valves 20 and 21.

Thus, when the opening degree of the intake throttle valve 17 is larger than the predetermined opening degree, the intake air having passed through the intake throttle valve 17 flows into both the first intake port 18 and the second intake port 19. At the same time, the fuel is injected from the first and second fuel injection valves 20 and 21 to the respective first and second intake ports 18 and 19, so as to promote the homogenization of the air-fuel mixture.

In this example as mentioned above, when the opening degree of the intake throttle valve 17 is equal to or less than the predetermined opening degree, the intake air flows only through the first intake port 18 to generate a swirl flow in the cylinder, while the fuel is injected from the first fuel injection valve 20 to the first intake port 18. This promotes the homogenization of the air-fuel mixture. When the opening degree of the intake throttle valve 17 is larger than the predetermined opening degree, the intake air flows through both the first intake port 18 and the second intake port 19, while the fuel is injected from the first and second fuel injection valves 20 and 21 to the respective first intake port 18 and the second intake port 19. This also promotes the homogenization of the air-fuel mixture. Thus, the homogenization of the air-fuel mixture can be promoted in all operation areas from a low load operation area where an opening degree of the intake throttle valve 17 is small to a high load operation area where an opening degree of the intake throttle valve 17 is large.

The amount of intake air can be adjusted according to the opening degree of the intake throttle valve 17, thereby preventing the occurrence of the swirl flow. Thus, the drastic change (torque shock) of the intake air amount hardly occurs due to the opening and closing of a control valve. Because a complicated control is not required to be performed in order to prevent the drastic change of the intake air amount, it can simplify the control of the intake throttle valve 17.

Since the intake throttle valve 17 has a function of adjusting the amount of intake air, and also a function of generating a swirl flow, a valve for adjusting the intake air amount and a valve for generating the swirl flow do not need to be provided independently. Thus, it can simplify the structure, and satisfy the demand for cost reduction.

In this example, the bore member 34 for inhibiting the flow of the intake air into the second intake port 19 is disposed on the side of the second intake port 19 with respect to the intake throttle valve 17. Thus, when the opening degree of the intake throttle valve 17 is equal to or less than the predetermined opening degree, the bore member 34 inhibits the flow of the intake air into the second intake port 19. This can generate the swirl flow effectively by the flow of the intake air only into the first intake port 18.

In this example, when the opening degree of the intake throttle valve 17 is larger than the predetermined opening degree, the amount of fuel injected from the first fuel injection valve 20 and the amount of fuel injected from the second fuel injection valve 21 are set according to the ratio of the amount of intake air flowing into the first intake port 18 to that into the second intake port 19. In this way, the amounts of fuel injected into the intake ports 18 and 19 can be changed according to the amounts of intake air flowing into the intake ports 18 and 19, thereby further promoting the homogenization of the air-fuel mixture.

In the above example, for the opening degree of the intake throttle valve 17 that is equal to or less than the predetermined opening degree, the fuel is injected from the first fuel injection valve 20, whereas, for the opening degree of the intake throttle valve 17 that is larger than the predetermined opening degree, the fuel is injected from both the first and second fuel injection valves 20 and 21. However, the opening degree for switching the injection of the fuel is not necessarily identical to the predetermined opening degree in which the flow of the intake air is switched. For example, an opening degree that is slightly larger (or slightly smaller) than the predetermined opening degree for switching the flow of the intake air may be set as an opening degree for switching the fuel injection. For the opening degree of the intake throttle valve 17 that is equal to or less than the opening degree for switching the fuel injection, the fuel may be injected from the first fuel injection valve 20. For the opening degree of the intake throttle valve 17 that is larger than the opening degree for switching the fuel injection, the fuel may be injected from both the first and second fuel injection valves 20 and 21.

Such changes and modifications are to be understood as being within the scope of the present invention as defined by the appended claims.

What is claimed is:

1. A valve control device for an internal combustion engine comprising:

an intake manifold for defining an intake air passage having first and second intake ports, which are located at a downstream side of the intake air passage, for each cylinder of the engine;

an intake throttle valve located in the intake air passage at an upstream side of the first and second intake ports, such that intake air flows into mainly the first intake port to generate a swirl flow when an opening degree of the intake throttle valve is not larger than a predetermined value, and flows into both the first and second intake ports when the opening degree of the intake throttle valve is larger than the predetermined value;

a first fuel injection valve located to inject fuel to the first intake port;

a second fuel injection valve located to inject the fuel to the second intake port; and a control unit which controls the first fuel injection valve and the second fuel injection valve to allow an injection of the fuel from substantially only the first fuel injection valve into the first intake port while the intake air flows into mainly the first intake port when the opening degree of the intake throttle valve is not larger than about the predetermined value, and controls the first fuel injection valve and the second fuel injection valve to allow injections of the fuel from both the first fuel injection valve and the second fuel injection valve while the intake flows into both the first and the second intake ports when the opening degree of the intake throttle valve is larger than about the predetermined value.

2. The valve control device for an internal combustion engine according to claim 1, further comprising
a bore member located in the intake air passage at a position adjacent to the intake throttle valve to prohibit a flow of the intake air to the second intake port when the opening degree of the intake throttle valve is not larger than the predetermined value.

3. The valve control device for an internal combustion engine according to claim 1,
wherein the control unit sets an amount of the fuel injected from the first fuel injection valve and an amount of the fuel injected from the second fuel injection valve are set according to a ratio of an amount of intake air flowing into the first intake port to that into the second intake port when the opening degree of the intake throttle valve is larger than about the predetermined value.

4. The valve control device for an internal combustion engine according to claim 1,
wherein the control unit controls the first fuel injection valve and the second fuel injection valve to allow the injection of the fuel from the first fuel injection valve when the opening degree of the intake throttle valve is not larger than the predetermined value, and controls the first fuel injection valve and the second fuel injection valve to allow the injections of the fuel from both the first fuel injection valve and the second fuel injection valve when the opening degree of the intake throttle valve is larger than the predetermined value.

5. The valve control device for an internal combustion engine according to claim 2, wherein the bore member has an inner surface provided to match with a shape of a contour of the intake throttle valve on a side of the second intake port when the opening degree of the intake throttle valve is not larger than the predetermined value.

6. The valve control device for an internal combustion engine according to claim 1, wherein the intake throttle valve member configured to adjust a flow amount of intake air and to generate the swirl flow when the opening degree of the intake throttle valve is not larger than the predetermined value.

7. A valve control method for an internal combustion engine which includes an intake air passage having first and second intake ports for each cylinder located at a downstream side of the intake air passage, the method comprising:
detecting an opening degree of an intake throttle valve that located in the intake air passage at an upstream side of the first and second intake ports;
determining whether the opening degree of the intake throttle valve is larger than a predetermined value;
controlling the intake throttle valve such that intake air flows into mainly the first intake port to generate a swirl flow when the opening degree of the intake throttle valve is not larger than a predetermined value, and flows into both the first and second intake ports when the opening degree of the intake throttle valve is larger than the predetermined value; and
controlling a first fuel injection valve and a second fuel injection valve to allow an injection of the fuel from substantially only the first fuel injection valve into the first intake port while the intake air flows into mainly the first intake port when the opening degree of the intake throttle valve is not larger than about the predetermined value, and controlling the first fuel injection valve and the second fuel injection valve to allow injections of the fuel from both the first fuel injection valve and the second fuel injection valve while the intake air flows both into the firs and second intake ports when the opening degree of the intake throttle valve is larger than about the predetermined value.

8. The valve control method for an internal combustion engine according to claim 7, further comprising
prohibiting a flow of the intake air to the second intake port when the opening degree of the intake throttle valve is not larger than the predetermined value.

9. The valve control method for an internal combustion engine according to claim 7,
wherein the controlling of the first and second fuel injection valves includes setting an amount of the fuel injected from the first fuel injection valve and an amount of the fuel injected from the second fuel injection valve in accordance with a ratio of an amount of intake air flowing into the first intake port to that into the second intake port when the opening degree of the intake throttle valve is larger than about the predetermined value.

10. The valve control method for an internal combustion engine according to claim 7, wherein said controlling a first fuel injection valve and a second fuel injection valve allows an injection of the fuel from only the first fuel injection valve into the first intake port when the opening degree of the intake throttle valve is not larger than the predetermined value, and the first fuel injection valve and the second fuel injection valve are controlled to allow injections of the fuel from both the first fuel injection valve and the second fuel injection valve when the opening degree of the intake throttle valve is larger than the predetermined value.

11. The valve control method for an internal combustion engine according to claim 8, wherein flow of intake air to the second intake port when the opening degree of the intake throttle valve is not larger than the predetermined value is prohibited by a bore member located in the intake air passage at a position adjacent to the intake throttle valve.

12. The valve control method for an internal combustion engine according to claim 11, wherein the bore member has an inner surface provided to match with a shape of a contour of the intake throttle valve on a side of the second intake port when the opening degree of the intake throttle valve is not larger than the predetermined value.

* * * * *